May 2, 1950            E. R. BEHN            2,505,936

TEMPERATURE COMPENSATED CONDUCTIVITY CELL ELECTRODE

Filed April 23, 1949            2 Sheets-Sheet 1

INVENTOR.
Eric R. Behn,
BY
Edward L. Mueller
ATTORNEY

May 2, 1950 — E. R. BEHN — 2,505,936
TEMPERATURE COMPENSATED CONDUCTIVITY CELL ELECTRODE
Filed April 23, 1949 — 2 Sheets-Sheet 2

INVENTOR.
Eric R. Behn,
BY
Edward L. Mueller
ATTORNEY

Patented May 2, 1950

2,505,936

UNITED STATES PATENT OFFICE 2,505,936

TEMPERATURE COMPENSATED CONDUCTIVITY CELL ELECTRODE

Eric R. Behn, Garden City, N. Y., assignor to Control Instrument Company, Inc., Brooklyn, N. Y., a corporation of New York Application April 23, 1949, Serial No. 89,332

2 Claims. (Cl. 175—183)

This invention relates to improvements in electrical measuring systems and has particular reference to a system for directly indicating the conductivity of a solution.

In systems of the above category it is necessary to compensate for temperature variation of the solution under test, in order to obtain an indication reading directly in terms of electrolyte concentration. In the past this has been accomplished by a manually settable compensator which may be set according to the indications of a thermometer, or by various forms of temperature compensating resistors all of which have a common fault which will hereinafter be discussed, and which are avoided by this invention.

In an electrolytic solution of a given concentration such as, for instance, fresh water contaminated with sea water, there exists a definite relationship of temperature to resistance. However, this relationship does not lend itself to a simple analytic expression for the reason that the relationship, as determined, becomes a function of the determining or measuring means. The problem, therefore, resolves itself into one of producing a compensated measuring system whose variation of indication with temperature is negligible.

An object of this invention is to produce an element having a co-efficient of resistance with temperature which, when combined with an adequate measuring system, will have the desired variation in resistance with temperature.

The inventive idea herein involved is capable of receiving a variety of expressions one of which for the purpose of illustration is shown in the accompanying drawings and described in the following specification; it is to be expressly understood, however, that the drawings and the specification are employed merely to facilitate the description of the invention as a whole and not to define the limits thereof, reference being made to the appended claims for that purpose.

Figure 1:
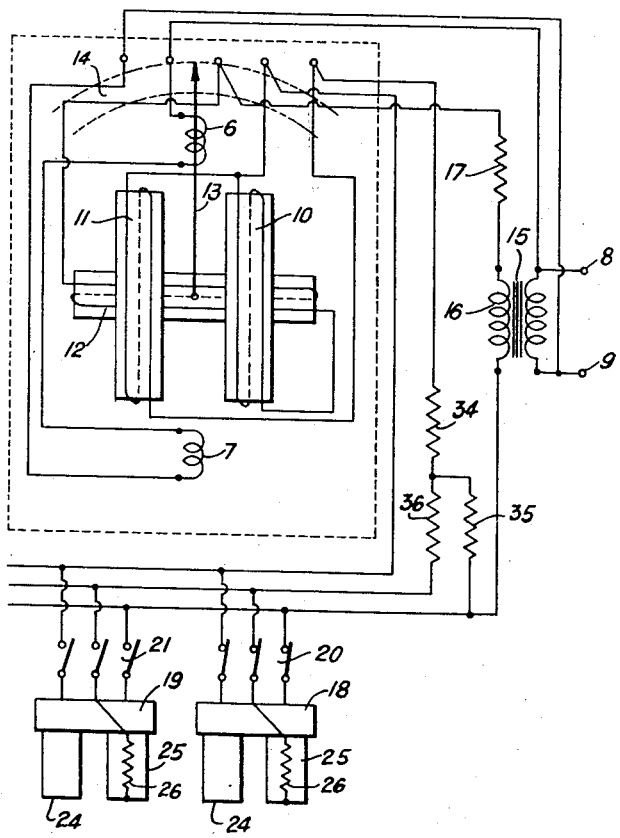
Fig. 1 is a diagrammatic view of a salinity metering system showing the application of the present invention thereto.

The invention is illustrated, by way of example, in its adaptation to a metering system such as is disclosed in the patent to Ellis, #2,306,691, issued December 29, 1942, and reference is made thereto for a complete understanding of the operation of the circuit.

Briefly, and as shown herein, the meter includes fixed coils 6 and 7 energized by connection to the input terminals 8 and 9 for a source of alternating current. Pivotally mounted in the field of said coil are the rigidly connected movable coils 10, 11 and 12, the first two of which are physically parallel while the last mentioned is at right angles to the other two. Coil 12 carries an indicator 13 which indicator moves over a calibrated scale 14 to indicate saline concentration in parts per million or any other chosen units.

The coils 10, 11 and 12 are all connected in series and, by way of various resistors, with the secondary 16 of transformer 15. As applied in this invention, one circuit is established by way of resistor 17 whose function it is to limit the current in the coils, coil 10 and coil 12 in series, and the resistance of the saline liquid under test; and the second circuit is established by way of resistor 17, coils 10, 12 and 11 in series and a resistance network including the temperature compensating element hereinafter to be described.

Referring to Fig. 1, two conductivity cells 18 and 19 are shown which, by way of the switches 20 and 21, may alternatively be connected to the metering circuit. The cells may be located at different points through which the liquid under test will circulate, and may be cyclically or manually connected to the metering circuit for the purpose of test.

Figure 2:
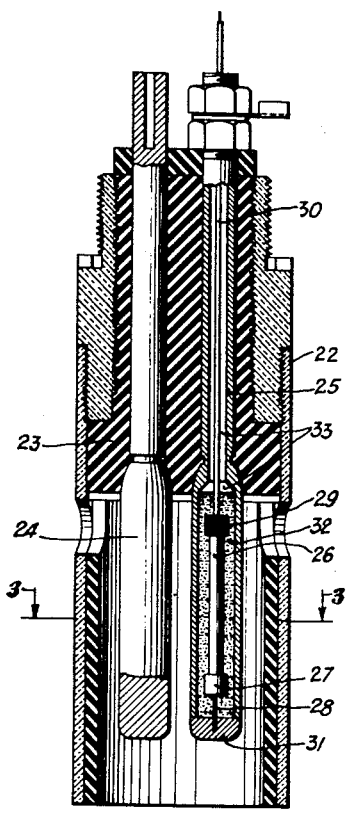
Fig. 2 is an enlarged vertical section through a conductivity cell illustrating its construction in accordance with the invention herein described.
Figure 3:
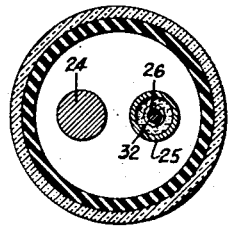
Fig. 3 is a section on the line 3—3 of Fig. 2.

The salinity cell which comprises this invention is illustrated in Fig. 2 wherein it is shown to be formed of a heat conducting casing 22 filled with an insulating material 23 through which pass a pair of electrodes 24 and 25. Electrode 24 is solid and is composed of or plated with a metal which is non-reactive to the liquid under test. Electrode 25 is hollow but otherwise similar in shape and material to electrode 24.

Within the confines of electrode 25 is placed a semi-conductor 26, such as is commercially available under the name of Thermistor, one end 27 of which is electrically connected at 28 to the bottom plug 31 of electrode 25. The other end 29 of the semi-conductor is extended upwardly, by means of the insulated lead 30, through the top of the electrode in order that electrical connection may be made thereto. In order to insulate the semi-conductor from the metallic shell within which it is contained, a dielectric 32 fills the space surrounding it, affording it both mechanical support and electrical insulation. However, it is essential that the variation in current in the Thermistor when connected in the circuit does not cause any temperature gradient or variation in temperature gradient between the Thermistor and the liquid under test due to its own power dissipation, and also that the temperature of the liquid under test be communicated to the Thermistor in order that its variation in resistance with temperature be available as a controlling element. Resistor 17 limits the current in the circuit to a safe value, and the insulating material 32 must have excellent properties of heat conductivity as well as good dielectric properties.

In order to acquire material with the required characteristic, various experiments were conducted, using liquids and solid materials and mixtures thereof, such as thermo-setting varnishes, glycerin, transformer oil, rosin oil, mixtures of rosin oil and finely comminuted silica, and mixtures of silicone fluid of low viscosity and finely comminuted silica. The last named mixture, consisting of a semi-solid, proved to be the most efficient, having the required heat conductivity characteristic, the required dielectric property, and the required mechanical and chemical inactivity which would coact with the Thermistor without injury thereto. This material is injected into the space around the Thermistor within the electrode 25 by removing the plug 31; and after filling the space surrounding the Thermistor and replacing said plug, the electrode is then vacuum impregnated with silicone fluid to make certain that no voids remain. Thus the silicone-silico mixture 32 surrounds the Thermistor, coupling it mechanically and thermally to the wall of the electrode 25, and the excess silicone fluid, due to the vacuum impregnation and to any thermal expansion, fills the capillary bore 33 directly above.

Unlike any other temperature compensating resistor, the unit is not sealed and yet it is contained substantially within and in intimate contact with the liquid whose temperature initiates its response. There is no change in characteristic due to the build-up of pressure due to thermal expansion; nor any danger of contamination, although the element is not sealed, because of the fineness of the capillary bore 33. There is also no leakage regardless of position, because the capillary bore is of such a diameter that, for the viscosity of the silicone employed, there will be no flow.

Figure 4:
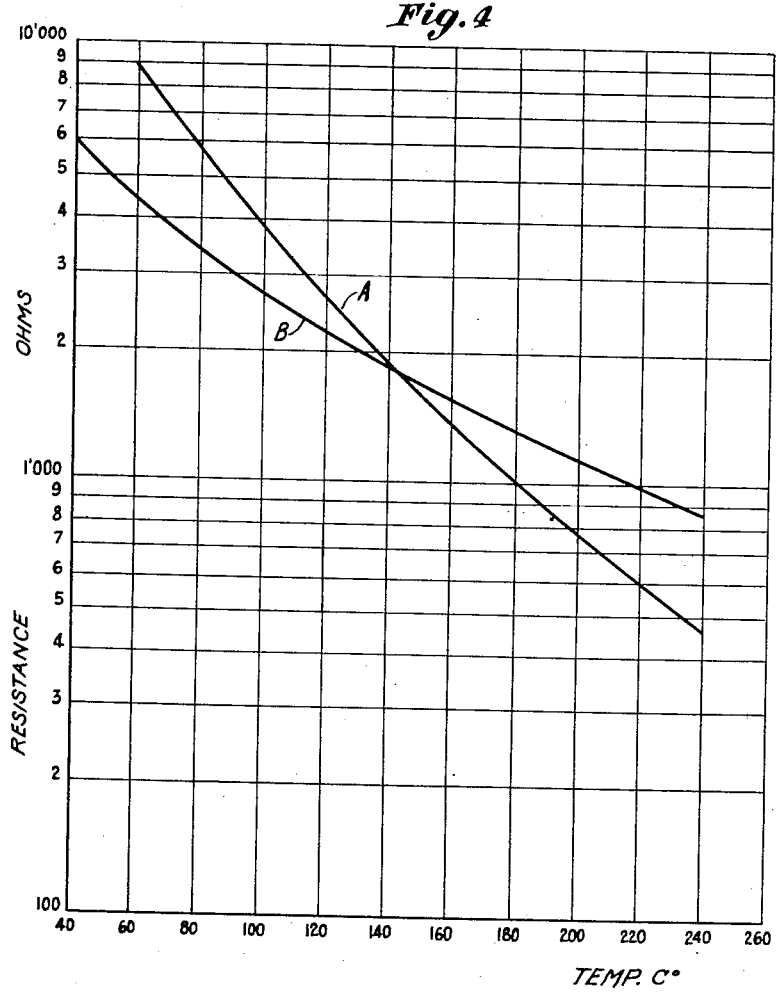
Fig. 4 is a graphic view showing the variation in resistance with temperature of the conductivity cell, and of its compensating element.

The semi-conductor or Thermistor 26, in and of itself, does not have a variation of resistance with temperature such that it will compensate for the conductivity change in a saline fluid with temperature. Referring to Fig. 4 the curve A shows the variation of resistance with temperature of the temperature sensitive Thermistor used herein. This curve corresponds to a resistance whose variation with temperature follows the expression $$R = R_0 e^{B\left(\frac{1}{T} - \frac{1}{T_0}\right)}$$

wherein

R=resistance at any temperature;
R₀=6300 ohms at temperature T₀;
B=3450±80;
T=temperature in degrees Kelvin; and
T₀=298.2° K.=25° C.

This characteristic must be modified so that the variation in resistance of the element is essentially the same as the variation in resistance of the liquid whose salinity it is intended to indicate.

Figure 5:
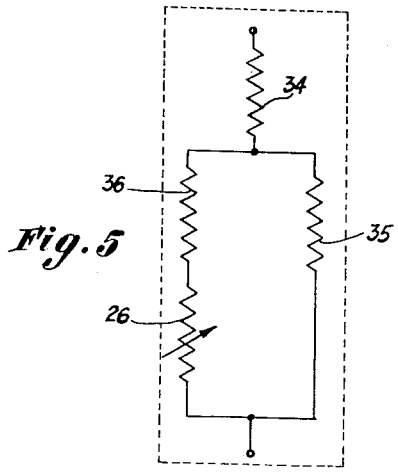
Fig. 5 is a schematic diagram of a network of resistances used in connection with the conductivity cell to produce the required variation in resistance with temperature.

By utilizing a network of resistances such as is shown in Fig. 5 the resistance characteristic of the Thermistor may be modified so that it is more nearly, or exactly, the variation in resistance with temperature that is required. Experiments show that by making the resistor 34 of 240 ohms, resistor 35 of 330 ohms and resistor 36 of 6700 ohms, the resistance network including the Thermistor 26 which is shown as a variable element will have a total temperature coefficient corresponding to that of a salt solution so that in cooperation with the measuring system the net change per degrees C. is negligible. As may be seen from Fig. 4, when the salt solution is relatively cold the Thermistor has a large resistance value, in excess of 5000 ohms. This resistance is effectively in parallel with resistor 36 so that the total effective resistance is thereby lessened and the network has a marked effect on the overall response of the Thermistor, limiting the maximum resistance to 6940 ohms. At elevated temperatures, however, it may be seen from curve A of Fig. 4 that the temperature sensitive element has a resistance of a few hundred ohms. This again is effectively in parallel with resistor 36 and even though the added resistance of resistor 35 is effectively in series, the resistance is so low that resistor 36 has relatively little effect. Thus the dynamic range of change in resistance with temperature is lessened so that curve B of Fig. 4 is produced, which curve is essentially the curve for an arbitrarily chosen concentration of salt water.

This concentration, although arbitrary, should be such a concentration as to allow sufficient sensitivity to the system and should therefore be as nearly the highest safe concentration permissible for the application in which the system is employed. The resistors 34, 35 and 36 are chosen for a given concentration and once chosen remain fixed, neither changing with temperature nor with current. Minor variations in the assigned values may occur, however, even for an arbitrarily chosen concentration of salt in water, to compensate for minor variations in the characteristics of the Thermistor elements themselves.

As thus disclosed, the salinity cell becomes a self-compensating element having, for a given concentration of saline fluid, a temperature coefficient equivalent to that of the saline fluid under test, and requiring no mechanical or external modifying means other than the fixed network disclosed to operate continuously and without attention in a completely accurate and automatic manner.

What is claimed is:

1. An electrode which comprises a thermally and electrically conductive shell, a semi-conductor having a pair of terminals and a negative temperature co-efficient of resistance lying within said shell one terminal of which is connected electrically to said shell, a filler comprising finely comminuted silica granules moistened with a silicone fluid of low viscosity and high thermal conductivity in said shell and coupling said semi-conductor thermally to said shell while insulating it electrically therefrom, and means for coupling a metering circuit to said shell and to the remaining terminal of said semi-conductor.

2. An electrode which comprises a thermally and electrically conductive shell, said shell being sealed at one end and being terminated in an open elongated capillary bore at the other, a semi-conductor having a pair of terminals and a negative temperature co-efficient of resistance lying within said shell one terminal of which is connected electrically to said shell, a filler comprising finely comminuted silica granules moistened with a silicone fluid of low viscosity and high thermal conductivity in said shell and coupling said semi-conductor thermally to said shell while insulating it electrically therefrom, and means for coupling a metering circuit to said shell and to the remaining terminal of said semi-conductor.

ERIC R. BEHN.

REFERENCES CITED

The following references are of record in the file of this patent:

UNITED STATES PATENTS

| Number | Name | Date |
|---|---|---|
| 2,048,047 | Austin | July 21, 1936 |
| 2,370,609 | Wilson et al. | Feb. 27, 1945 |
| 2,450,459 | Thomson | Oct. 5, 1948 |
| 2,456,117 | Feller | Dec. 14, 1948 |
| 2,470,153 | Feller | May 17, 1949 |